US011688983B2

(12) United States Patent
Sato et al.

(10) Patent No.: US 11,688,983 B2
(45) Date of Patent: Jun. 27, 2023

(54) BUS BAR MODULE AND BATTERY PACK

(71) Applicant: Yazaki Corporation, Tokyo (JP)

(72) Inventors: Katsunori Sato, Shizuoka (JP); Yutaro Okazaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 504 days.

(21) Appl. No.: 16/567,528

(22) Filed: Sep. 11, 2019

(65) Prior Publication Data

US 2020/0006739 A1 Jan. 2, 2020

Related U.S. Application Data

(63) Continuation of application No. PCT/JP2017/010476, filed on Mar. 15, 2017.

(51) Int. Cl.
*H01R 25/16* (2006.01)
*H01M 50/209* (2021.01)
(Continued)

(52) U.S. Cl.
CPC .......... *H01R 25/16* (2013.01); *H01M 50/209* (2021.01); *H01M 50/503* (2021.01);
(Continued)

(58) Field of Classification Search
CPC .... H01M 2/206; H01M 2/1077; H01M 2/305; H01M 2/30; H01M 50/50; H01M 50/502; H01M 50/503; H01M 50/505; H01M 50/507; H01M 50/509; H01M 50/517; H01M 50/514; H01M 50/528;
(Continued)

(56) References Cited

U.S. PATENT DOCUMENTS

| 2012/0306474 | A1* | 12/2012 | Ikeda | H01R 13/72 324/72 |
| 2012/0328920 | A1 | 12/2012 | Takase et al. | |
| 2013/0280959 | A1* | 10/2013 | Takase | H01R 11/12 439/627 |

FOREIGN PATENT DOCUMENTS

| JP | 2011-210710 A | 10/2011 |
| JP | 2012-064455 A | 3/2012 |

(Continued)

OTHER PUBLICATIONS

English translation of WO2015099062.*
(Continued)

*Primary Examiner* — Kiran Quraishi Akhtar
(74) *Attorney, Agent, or Firm* — Sughrue Mion, PLLC

(57) ABSTRACT

A bus bar module includes a plurality of bus bars each having a through hole into which an electrode terminal of an electrode terminal group arranged in a line on a battery module formed of a plurality of battery cells is inserted, the bus bars being arranged along an arranging direction of the electrode terminal in the electrode terminal group, and a flat cable including a conductor part electrically connected to the bus bars, and an insulating holding part for holding the bus bars. The bus bar includes a holding body to be fitted to the flat cable. The holding part has a holding hole for each of the bus bars that allows a relative movement of the bus bar with respect to the flat cable in the arranging direction, by allowing a relative movement of the inserted holding body in the arranging direction.

5 Claims, 11 Drawing Sheets

(51) Int. Cl.
- *H01M 50/503* (2021.01)
- *H01M 50/507* (2021.01)
- *H01M 50/55* (2021.01)
- *H01M 50/553* (2021.01)

(52) U.S. Cl.
CPC .......... *H01M 50/507* (2021.01); *H01M 50/55* (2021.01); *H01M 50/553* (2021.01)

(58) Field of Classification Search
CPC .. H01M 50/55; H01M 50/553; H01M 50/209; H01R 11/288; H01R 25/16; H01R 25/161; H01R 25/162; Y02E 60/10
See application file for complete search history.

(56) References Cited

FOREIGN PATENT DOCUMENTS

| | | | | |
|---|---|---|---|---|
| JP | 2015-050063 A | | 3/2015 | |
| JP | 2015050063 | * | 3/2015 | ............. Y02E 60/10 |
| WO | WO2015099062 | * | 7/2015 | .......... H01M 50/502 |

OTHER PUBLICATIONS

English Translation of JP2015050063.*
International Search Report for PCT/JP2017/010476 dated Jun. 20, 2017 [PCT/ISA/210].

* cited by examiner

BUS BAR MODULE AND BATTERY PACK

CROSS-REFERENCE TO RELATED APPLICATION

This application is a continuation of International Application No. PCT/JP2017/010476, filed on Mar. 15, 2017, the entire contents of which are incorporated herein by reference.

BACKGROUND OF THE INVENTION

1. Field of the Invention

The present invention relates to a bus bar module and a battery pack.

2. Description of the Related Art

Conventionally, in an electric vehicle or a hybrid vehicle, from a viewpoint such as output and a cruising range, a battery module in which a number of battery cells are arranged side by side and are connected in series or in parallel is mounted. In the battery module, in a state in which electrode terminals at one side of the battery cells are arranged in a line and electrode terminals at the other side of the battery cells are also arranged in a line, the battery cells are continuously disposed. The battery module is stored in a casing including a storage chamber for each of the battery cells, and is configured as a battery pack with a bus bar module and the like. For example, the bus bar module is provided for each electrode terminal group arranged in a line. The bus bar module at least includes a plurality of bus bars that electrically connect the electrode terminals of the adjacent battery cells, and a linear conductor for each of the bus bars that is electrically connected to the bus bar. A through hole into which the electrode terminal is inserted is formed on the bus bar. The axial direction of a plurality of the linear conductors is aligned, and the linear conductors are disposed side by side in the orthogonal direction with respect to the axial direction. The linear conductors are configured as a flat cable that is covered by a covering part with flexibility to be integrated. The bus bars are integrated with the covering part. For example, such bus bar module and battery pack are disclosed in Japanese Patent Application Laid-open No. 2011-210710.

In the battery module, due to size variation and assembly variation of the battery cell and the casing, the pitch between the adjacent electrode terminals in the electrode terminal group may be shifted from the design value within a range of tolerance. Consequently, in the electrode terminal group, the pitch between the electrode terminals at both ends may be significantly shifted from the design value, when the pitch shifts are accumulated. Consequently, even when the electrode terminal at one end can be inserted into the through hole of the bus bar at one end of the bus bar module, the electrode terminal at the other end may not be inserted into the through hole of the bus bar at the other end. In the bus bar module disclosed in Japanese Patent Application Laid-open No. 2011-210710, in the flat cable, a U-shaped bending part is provided between the adjacent bus bars so as to be able to expand and contract in the longitudinal direction (axial direction of the linear conductor). By configuring in this manner, the pitch shift between the electrode terminals is absorbed, and all the bus bars are inserted into the electrode terminals. However, because the bending part is bent with the linear conductor, the durability of the flat cable may be deteriorated by the load applied during the bending process and when the bending part is expanded or contracted.

SUMMARY OF THE INVENTION

An object of the present invention is to provide a bus bar module and a battery pack capable of suppressing deterioration of durability.

In order to achieve the above mentioned object, a bus bar module according to one aspect of the present invention includes a plurality of bus bars each having a through hole into which an electrode terminal of an electrode terminal group arranged in a line on a battery module formed of a plurality of battery cells is inserted, the bus bars being arranged along an arranging direction of the electrode terminal in the electrode terminal group; and a flat cable that includes a conductor part electrically connected to the bus bars, and a holding part having an insulating property for holding the bus bars, wherein each of the bus bars includes a holding body to be fitted to the flat cable, the holding part has a holing hole for each of the bus bars that allows a relative movement of the bus bar with respect to the flat cable in the arranging direction, by allowing a relative movement of the inserted holding body in the arranging direction, the bus bars are roughly divided into a single reference bus bar that is to be a reference of an assembly position with respect to the battery module, and remaining bus bars other than the reference bus bar, and the holding hole for holding the reference bus bar is formed such that a relative movement of the reference bus bar with respect to the flat cable at least in the arranging direction is restricted, by restricting a relative movement of the inserted holding body in the arranging direction.

According to another aspect of the present invention, in the bus bar module, it is desirable that the reference bus bar is selected from the bus bars disposed at a center when viewed from all the bus bars.

According to still another aspect of the present invention, in the bus bar module, it is desirable that a tip end part of the conductor part is tilted and bent with respect to the arranging direction for each linear conductor to be paired with the bus bar, and the conductor part electrically connects the linear conductor at the tip end part with the bus bar to be paired.

In order to achieve the above mentioned object, a battery pack according to still another aspect of the present invention includes a battery module formed of a plurality of battery cells; and a bus bar module that electrically connects the battery cells in series or in parallel, wherein the bus bar module includes a plurality of bus bars each having a through hole into which an electrode terminal of an electrode terminal group arranged in a line on the battery module is inserted, the base bars being arranged along an arranging direction of the electrode terminal in the electrode terminal group, and a flat cable that includes a conductor part electrically connected to the bus bars, and a holding part having an insulating property for holding the bus bars, each of the bus bars includes a holding body to be fitted to the flat cable, the holding part has a holding hole for each of the bus bars that allows a relative movement of the bus bar with respect to the flat cable in the arranging direction, by allowing a relative movement of the inserted holding body in the arranging direction, the bus bars are roughly divided into a single reference bus bar that is to be a reference of an assembly position with respect to the battery module, and remaining bus bars other than the reference bus bar, and the holding hole for holding the reference bus bar is formed such that a relative movement of the reference bus bar with respect to the flat cable at least in the arranging direction is restricted, by restricting a relative movement of the inserted holding body in the arranging direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of a bus bar module and a battery pack according to the present invention will be described in detail with reference to the accompanying drawings. It is to be understood that this invention is not limited to the embodiment.

Embodiment

An embodiment of a bus bar module and a battery pack according to the present invention will now be described with reference to FIG. 1 to FIG. 10.

Figure 1:
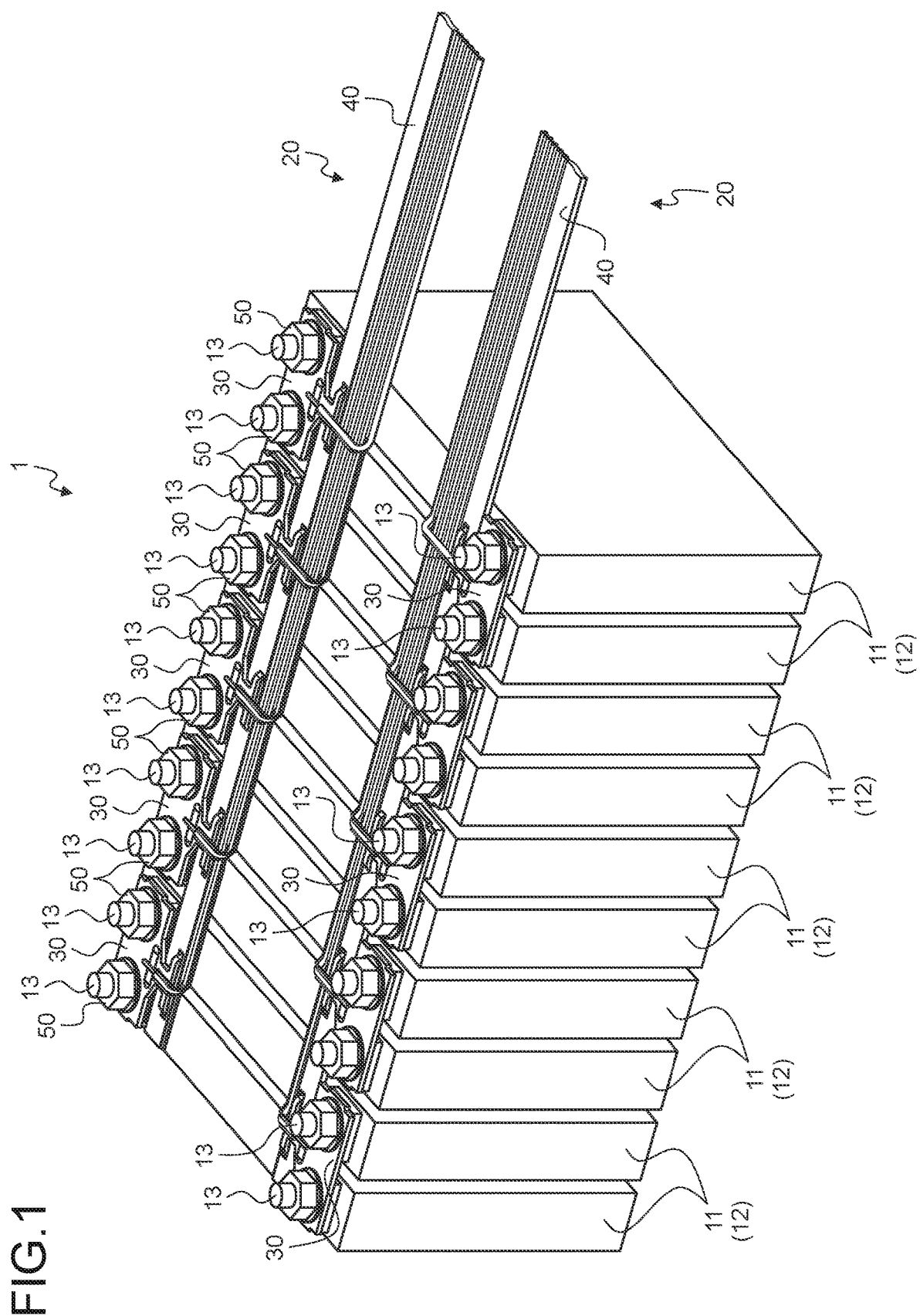
FIG. 1 is a perspective view illustrating a battery pack according to an embodiment.
Figure 2:
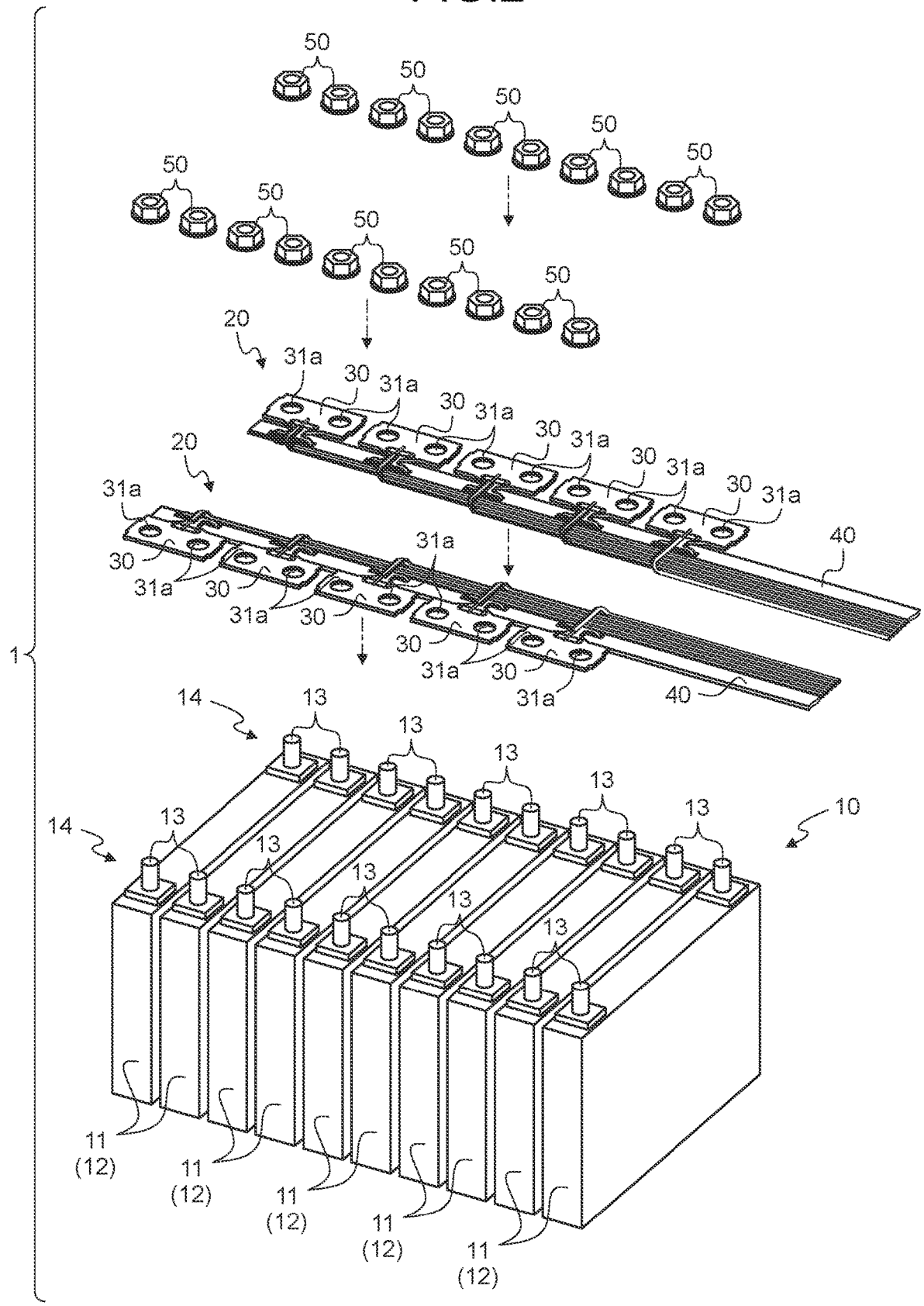
FIG. 2 is an exploded perspective view of the battery pack according to the embodiment.

A reference numeral 1 in FIG. 1 and FIG. 2 indicates a battery pack of the present embodiment. A reference numeral 10 indicates a battery module of the battery pack 1. A reference numeral 20 indicates a bus bar module of the battery pack 1.

The battery pack 1 is mounted on a vehicle such as an electric vehicle and a hybrid vehicle. The battery pack 1 includes the battery module 10 and the bus bar module 20. The battery module 10 is an assembly of a plurality of battery cells 11. The bus bar module 20 is an assembly of a plurality of bus bars 30 and a flat cable 40. In the bus bar module 20, the battery cells 11 of the battery module 10 are electrically connected in series or in parallel. In the battery pack 1, the battery module 10 is stored in a casing provided with a storage chamber for each of the battery cells 11. In the present embodiment, for convenience sake, illustration of the casing is omitted.

The battery cell 11 includes two electrode terminals 13 at one end of a cell main body 12. For example, the cell main body 12 of the battery cell 11 in this example is formed in a cuboid shape, and the electrode terminals 13 are provided on one of the surfaces. In this example, the surface on which the electrode terminals 13 are provided is directed upward of the vehicle. In the battery cell 11, two stud bolts are vertically provided at both ends of the surface in the longitudinal direction, and the stud bolts are used as the electrode terminals 13. Consequently, each of the electrode terminals 13 extends in the orthogonal direction with respect to the surface. One of the electrode terminals 13 functions as a positive electrode, and the other electrode terminal 13 functions as a negative electrode.

In the battery module 10, in a state in which the electrode terminals 13 at one side of the battery cells 11 are arranged in a line, and the electrode terminals 13 at the other side of the battery cells 11 are also arranged in a line, the battery cells 11 are continuously disposed. In other words, the battery module 10 is virtually formed in a cuboid shape by the battery cells 11, and two electrode terminal groups 14 formed by the electrode terminals 13 arranged in a line are provided on one of the surfaces of the battery module 10. In each of the electrode terminal groups 14 of the battery module 10, positive and negative electrode terminals 13 may be alternately disposed, or the electrode terminals 13 of the same pole may be disposed side by side. The latter is illustrated in FIG. 1 and FIG. 2.

As described above, the bus bar module 20 includes the bus bars 30 and the flat cable 40. The battery pack 1 of the present embodiment includes the bus bar module 20 for each of the electrode terminal groups 14.

Figure 3:
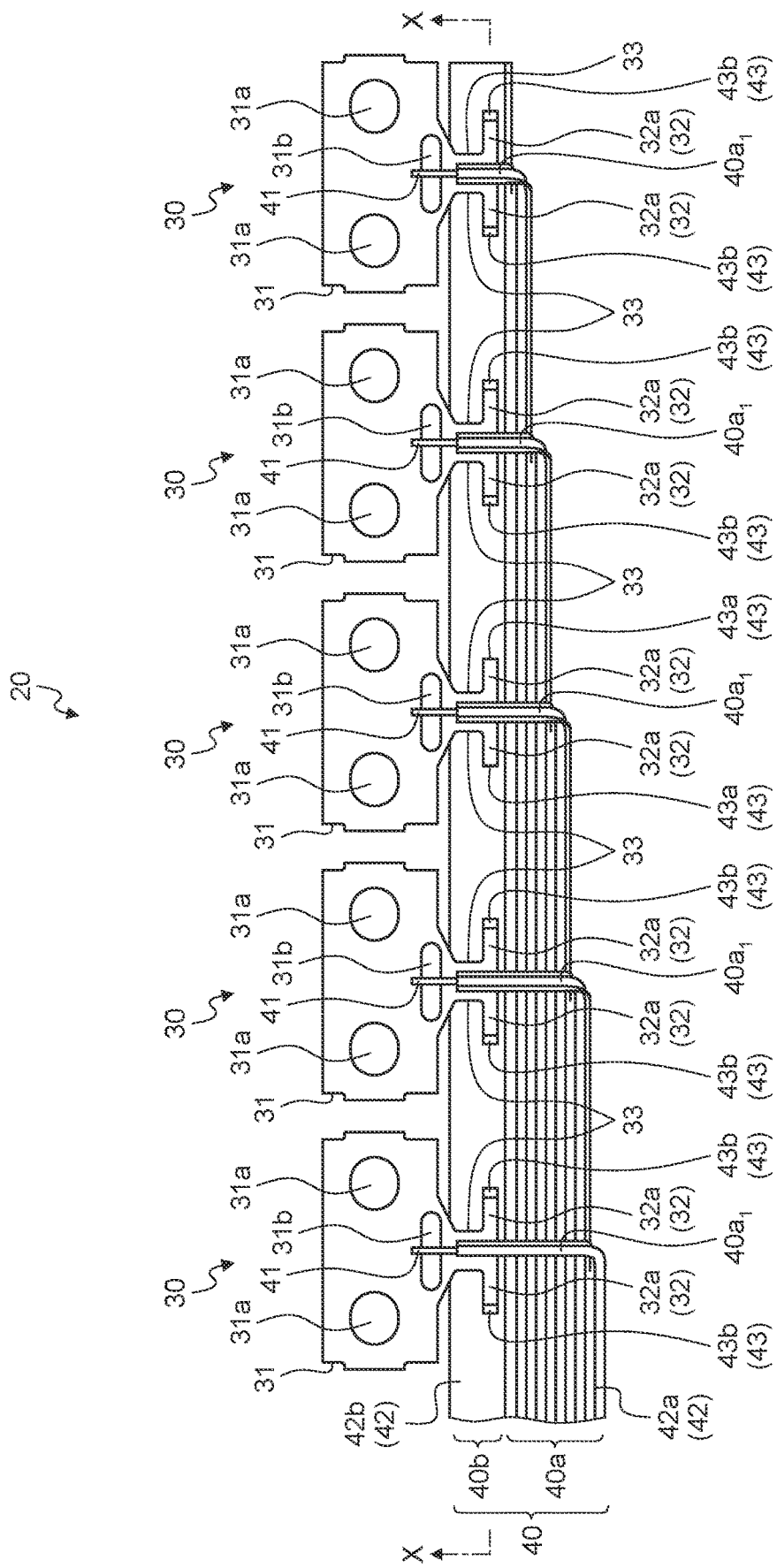
FIG. 3 is a front view illustrating a bus bar module according to the embodiment.
Figure 4:
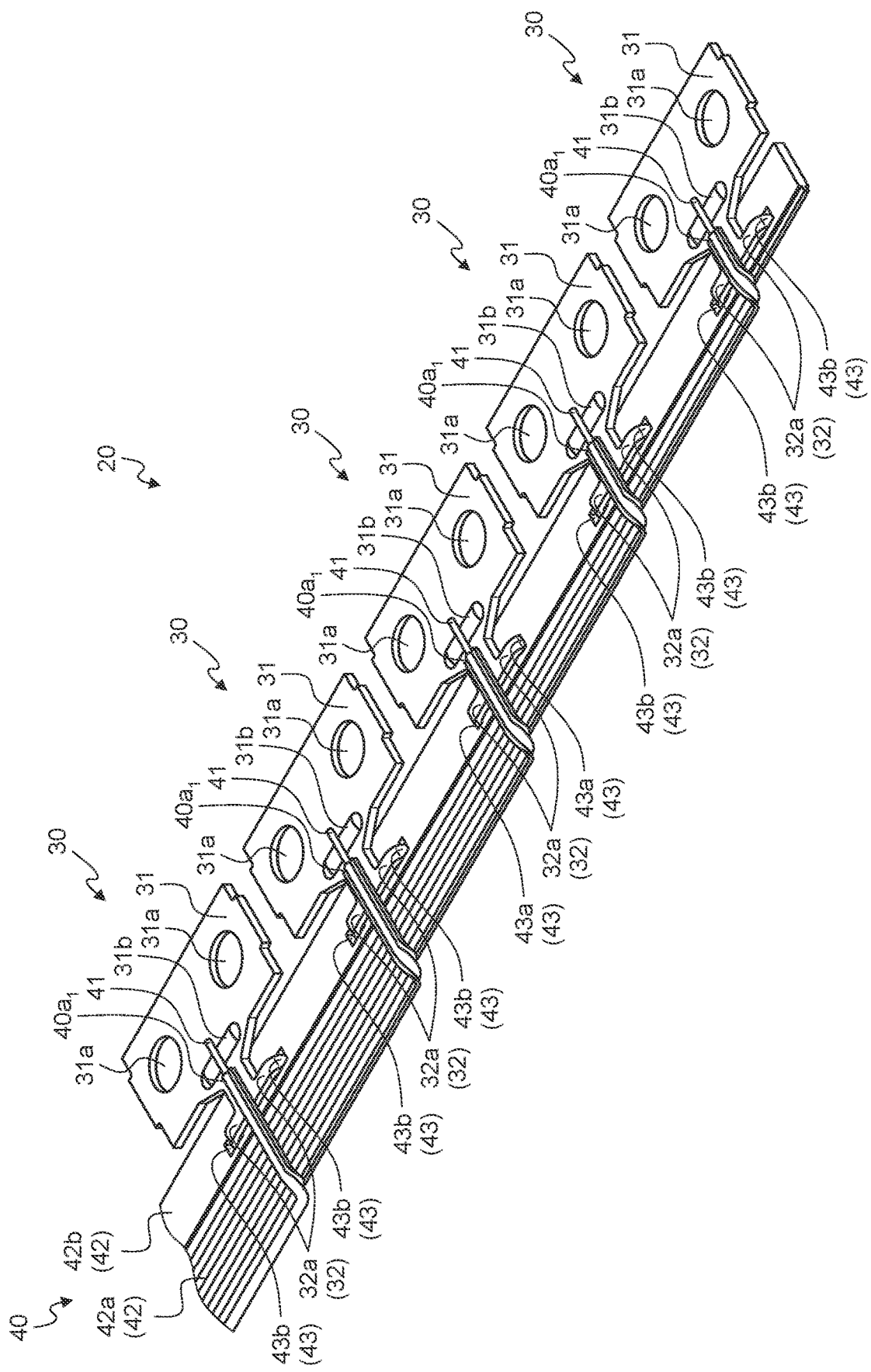
FIG. 4 is a perspective view illustrating the bus bar module according to the embodiment.
Figure 5:
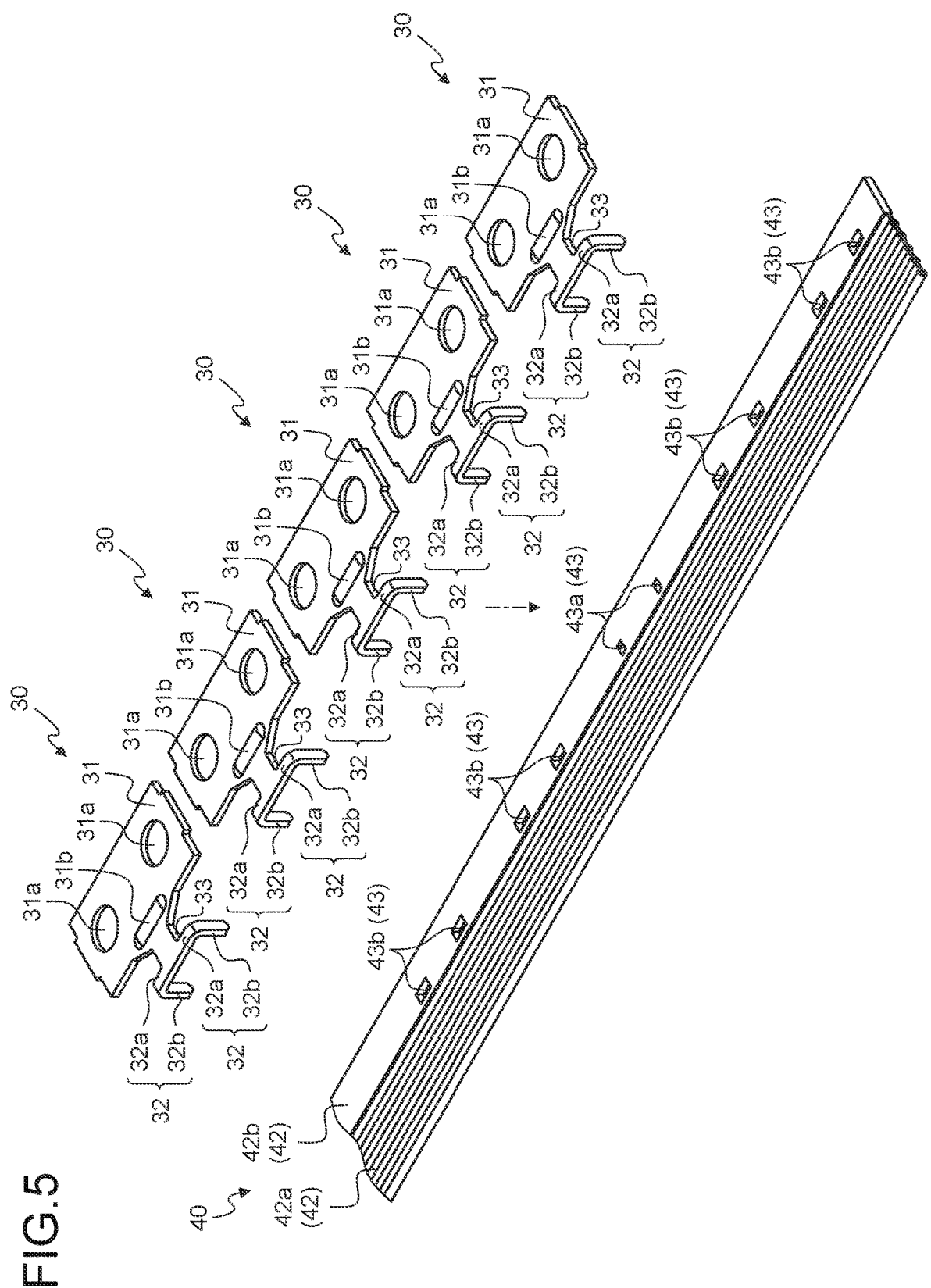
FIG. 5 is an exploded perspective view of the bus bar module according to the embodiment.

Each of the bus bars 30 is provided with a flat-shaped bus bar main body 31 made of a conductive material (FIG. 3 to FIG. 5). The bus bar 30 is electrically connected to the electrode terminal 13 via the bus bar main body 31. Welding, screwing, or the like is used to electrically connect the bus bar main body 31 with the electrode terminal 13. In the present embodiment, the electrode terminal 13 also functions as the stud bolt. Consequently, by fastening a nut 50 illustrated in FIG. 1 and FIG. 2 to the electrode terminal 13, the bus bar main body 31 is physically and electrically connected to the electrode terminal 13. Thus, a through hole 31a into which the electrode terminal 13 is inserted is formed on the bus bar main body 31. A plurality of the bus bars 30 are arranged along the arranging direction of the electrode terminals 13 in the electrode terminal group 14. Moreover, the bus bars 30 are fixed to the flat cable 40. Thus, a holding body 32 used for fitting the bus bar 30 to the flat cable 40 is provided on the bus bar 30.

More specifically, the bus bar 30 of the present embodiment includes the rectangular-shaped bus bar main body 31, the holding body 32 provided at an end of the bus bar main body 31, and a coupling body 33 for coupling the bus bar main body 31 with the holding body 32. For example, the bus bar 30 is formed by applying a pressing process such as a punching process and a bending process onto a metal plate serving as a base material.

The bus bar 30 of the present embodiment electrically connects the two adjacent electrode terminals 13 in the electrode terminal group 14. Thus, two of the through holes 31a are formed side by side in the bus bar main body 31. The design value of the pitch between the two through holes 31a is made to match with the design value of the pitch between the two adjacent electrode terminals 13. Moreover, the size and the shape of the two through holes 31a with respect to the electrode terminals 13 are set such that the bus bar 30 can be assembled to the battery cell 11, even when an interval between the electrode terminals 13 of the two adjacent battery cells 11 is shifted to the maximum extent within a range of tolerance. The bus bar module 20 of the present embodiment includes the bus bars 30 as many as a half of the total number of the battery cells 11.

In the bus bar main body 31, the holding body 32 is provided at an end part side of the bus bar main body 31 between both end parts that are placed in the orthogonal direction with respect to the arranging direction of the two through holes 31a (in other words, the arranging direction of the electrode terminals 13 in the electrode terminal group 14). In the bus bar 30 of the present embodiment, two holding bodies 32 are provided on the same straight line as that of the arranging direction. The holding body 32 includes a first caulking part 32a that extends from the base on the straight line, and a second caulking part 32b that extends from an end part at the extending side of the first caulking part 32a in the orthogonal direction with respect to the first caulking part 32a (FIG. 5). In the holding bodies 32, the extending direction of the first caulking parts 32a is opposite from each other, and the bases of the first caulking parts 32a are coupled to each other. The coupling body 33 joins the coupled portion and the bus bar main body 31. In the bus bar 30 of the present embodiment, the first caulking part 32a and the coupling body 33 are disposed on the same plane as that of the bus bar main body 31.

Figure 6:
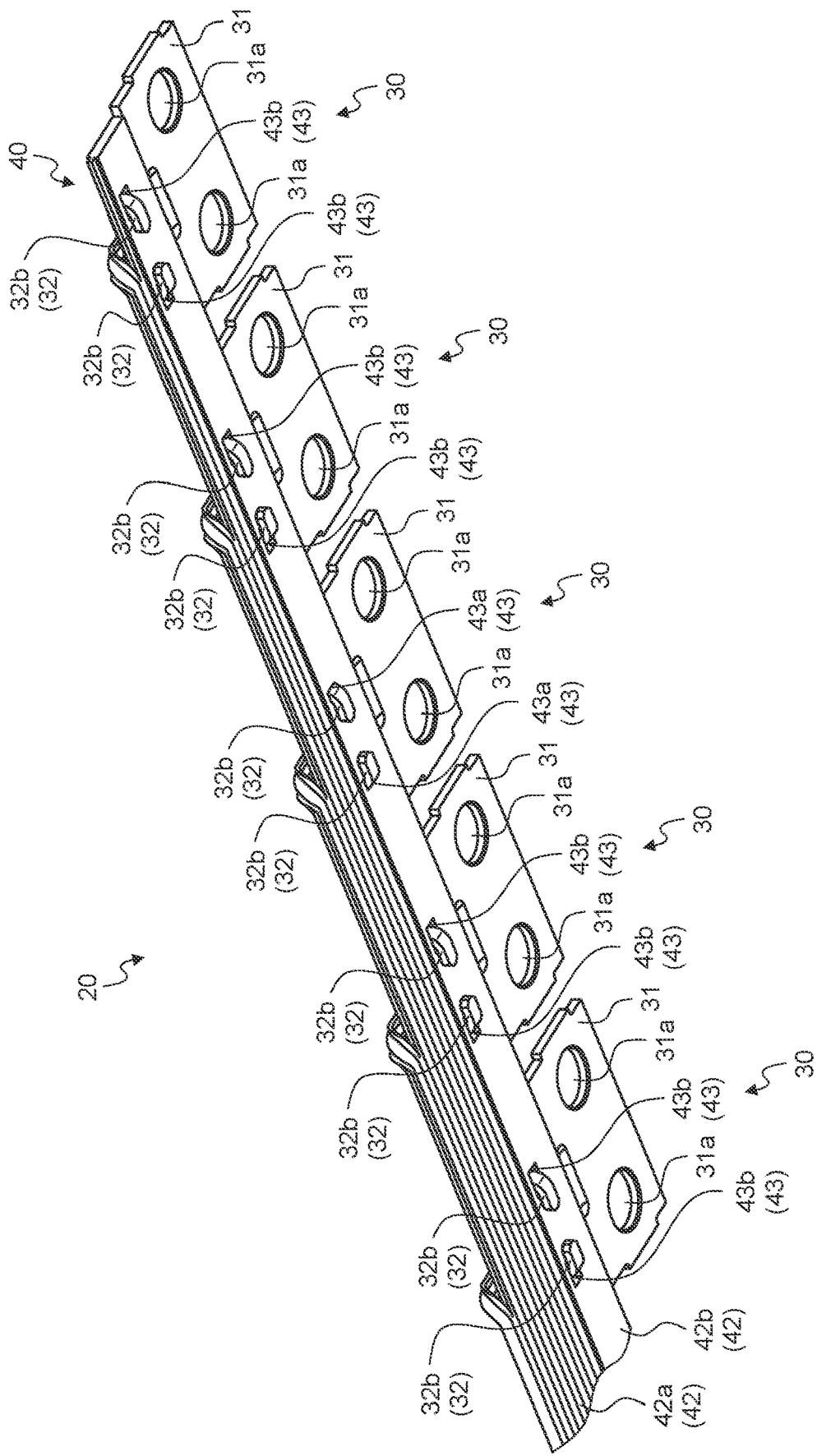
FIG. 6 is a perspective view of the bus bar module according to the embodiment viewed from a rear surface side.
Figure 7:
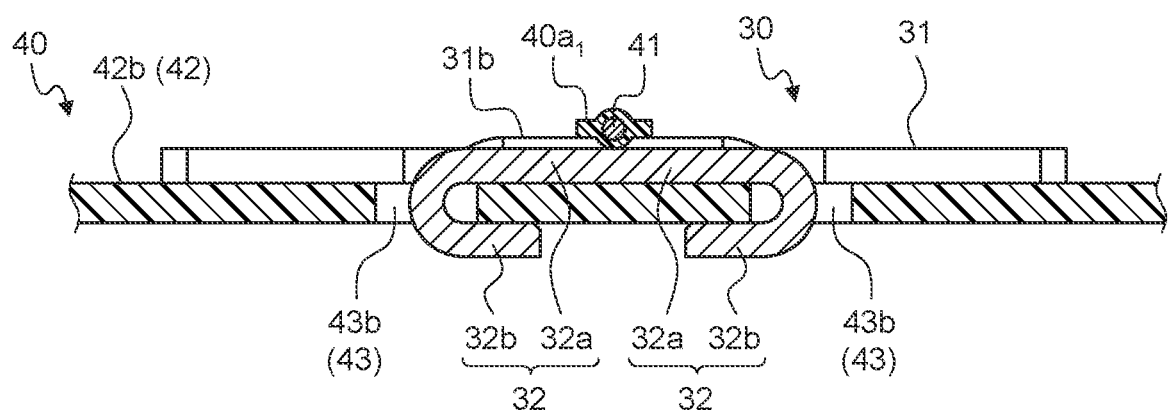
FIG. 7 is a sectional view of a second holding hole portion of the bus bar module cut along a line X-X in FIG. 3.
Figure 8:
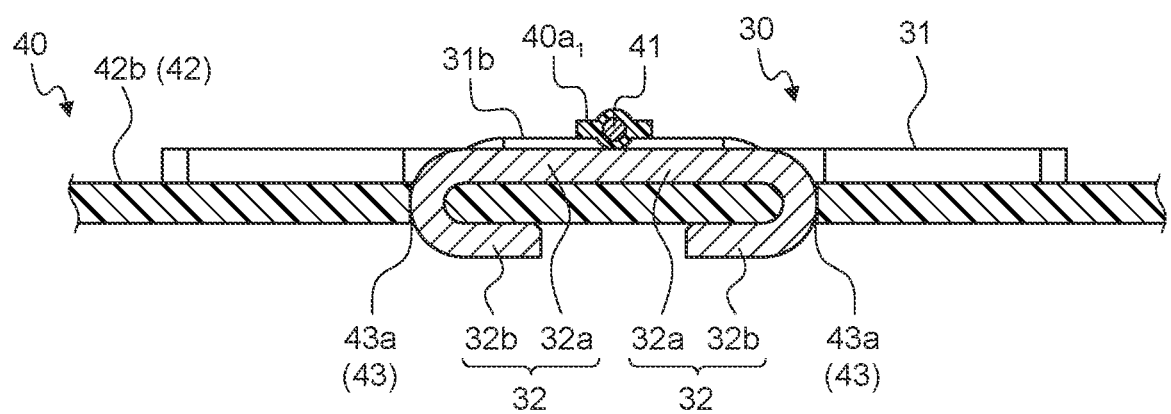
FIG. 8 is a sectional view of a first holding hole portion of the bus bar module cut along the line X-X in FIG. 3.

The holding bodies 32 are fixed to the flat cable 40 by inserting the second caulking part 32b into a holding hole 43, which will be described below, of the flat cable 40, and bending the second caulking part 32b from the base (coupled portion with the first caulking part 32a). The bending direction may be any direction. In this example, the second caulking part 32b is bent such that the second caulking part 32b is folded back toward the first caulking part 32a side, and is caulked such that the flat cable 40 is sandwiched between the first caulking part 32a and the second caulking part 32b (FIG. 6 to FIG. 8).

The flat cable 40 is roughly divided into a conductor part 40a and a holding part 40b (FIG. 3). The flat cable 40 includes a linear conductor 41 as many as that of the bus bars 30, and a covering body 42 that integrates a plurality of the linear conductors 41 at intervals. The conductor part 40a is a portion that electrically connects the bus bars 30 with a connector (not illustrated), and is configured by the linear conductors 41 and a part of the insulating covering body 42 (covering part 42a, which will be described below). The connector is provided at an end of the conductor part 40a, and by being fitted to a counterpart connector, collectively connects the linear conductors 41 to a conductor of the counterpart connector. The holding part 40b is a portion that holds the bus bars 30, and is configured by the remaining portion of the covering body 42 (rib 42b, which will be described below).

For example, the linear conductor 41 is used as a voltage detection line for detecting the voltage of the battery cell 11. This linear conductor 41 has a linear cylindrical body and is made of a conductive material such as metal (for example, copper). The linear conductor 41 has flexibility so that a bending process can be performed thereon. A single linear conductor 41 is provided for each of the bus bars 30. The linear conductors 41 are disposed on the same plane, by aligning the axial direction and by being arranged side by side in the orthogonal direction with respect to the axial direction at intervals. The axial direction of the linear conductors 41 is made to match with the arranging direction of the bus bars 30 (in other words, the arranging direction of the electrode terminals 13 in the electrode terminal group 14). Moreover, the linear conductors 41 are disposed side by side at the holding body 32 side of the bus bar 30 at intervals. Furthermore, the linear conductors 41 are disposed such that a virtual plane formed by the linear conductors 41 is substantially parallel to the plane of the bus bar main body 31. It is to be noted that when the number of the linear conductors 41 that can be disposed on the same plane such as above is limited, a plurality of combinations of the linear conductors 41 disposed on the same plane may be prepared, and all the linear conductors 41 may be disposed by overlapping the combinations in layers.

The external shape of the covering body 42 is formed in a flat shape, by using a material having an insulating property and flexibility such as synthetic resin. The covering body 42 includes a covering part 42a that covers the linear conductors 41 disposed as above, and a rib 42b that is protruded from the covering part 42a in the orthogonal direction with respect to the axial direction of the linear conductors 41, and that is at the bus bar 30 side. The covering part 42a includes a columnar-shaped portion that individually covers each of the linear conductors 41, and a flat and rectangular portion that couples the adjacent columnar-shaped portions. The rib 42b is formed in a flat and rectangular shape. In the rib 42b, a through hole (hereinafter, referred to as a "holding hole") 43 for holding each of the bus bars 30 is formed for each bus bar 30. The holding holes 43 are disposed along the longitudinal direction of the flat cable 40 (in other words, the arranging direction of the electrode terminals 13 in the electrode terminal group 14).

The holding hole 43 is provided at two locations in each bus bar 30. The holding holes 43 are formed aligned with the second caulking part 32b so that the second caulking part 32b of the bus bar 30 can be inserted therein. For example, the bus bars 30 are roughly divided into a single bus bar (hereinafter, may also be referred to as a "reference bus bar") 30 that is to be a reference of the assembly position with respect to the battery module 10, and the remaining bus bars 30 other than the reference bus bar 30. Consequently, as the holding hole 43, a first holding hole 43a for holding the reference bus bar 30, and a second holding hole 43b for holding the remaining bus bars 30 other than the reference bus bar 30 are formed on the rib 42b (holding part 40b). It is to be noted that when the reference bus bar 30 is not set, all the holding holes 43 may be formed by the second holding holes 43b.

The first holding hole 43a is formed so as to restrict the relative movement of the inserted holding body 32 in the longitudinal direction, so as to restrict the relative movement of the reference bus bar 30 with respect to the flat cable 40, at least in the longitudinal direction of the flat cable 40. For example, the first holding hole 43a is formed at two locations so as to correspond to the two second caulking parts 32b of the reference bus bar 30 that is disposed on the rib 42b as designed. The length of the first holding hole 43a along the longitudinal direction of the flat cable 40 is formed equivalent to the sheet thickness of the second caulking part 32b along the longitudinal direction. Consequently, by inserting the two second caulking parts 32b into the first holding holes 43a at two locations, and by bending the second caulking parts 32b, the movement of the reference bus bar 30 is restricted so that the relative movement of the reference bus bar 30 with respect to the flat cable 40 will not be possible in the longitudinal direction of the flat cable 40. In this example, the length of the first holding hole 43a along the orthogonal direction with respect to the longitudinal direction (short direction of the flat cable 40) is formed equivalent to the width of the second caulking part 32b along the short direction. Consequently, the relative movement of the reference bus bar 30 with respect to the flat cable 40 in the short direction is also restricted. It is to be noted that the length of the first holding hole 43a along the short direction of the flat cable 40 may also be formed longer than the width of the second caulking part 32b along the short direction.

The second holding hole 43b is provided for each of all the bus bars 30 other than the reference bus bar 30. The second holding hole 43b is formed so as to allow the relative movement of the inserted holding body 32 in the longitudinal direction, so as to allow the relative movement of the bus bar 30 with respect to the flat cable 40 in the longitudinal direction of the flat cable 40. For example, the second holding hole 43b is formed at two locations in each bus bar 30 so as to correspond with the two second caulking parts 32b of the bus bar 30 that is disposed on the rib 42b as designed. The wall surfaces of the second holding hole 43b in the longitudinal direction of the flat cable 40 are provided on the rib 42b at positions with respect to the second caulking part 32b disposed at intervals as designed. Consequently, in the bus bar 30, after the two second caulking parts 32b are inserted into the second holding holes 43b at the two locations and are bent (FIG. 7), a gap is formed between the bent part and the wall surfaces of the second holding hole 43b in the longitudinal direction of the flat cable 40. Thus, the relative movement of the bus bar 30 is possible with respect to the flat cable 40 in the longitudinal direction of the flat cable 40. In this example, the length of the second holding hole 43b along the orthogonal direction with respect to the longitudinal direction (short direction of the flat cable 40) is formed equivalent to the width of the second caulking part 32b along the short direction. Consequently, the relative movement of the bus bar 30 with respect to the flat cable 40 in the short direction is restricted. It is to be noted that the length of the second holding hole 43b along the short direction of the flat cable 40 may also be formed longer than the width of the second caulking part 32b along the short direction.

In the bus bar module 20, any bus bar 30 may be set as the reference bus bar 30. However, to reduce the gap between the second caulking part 32b and the second holding hole 43b in the longitudinal direction of the flat cable 40, it is preferable to select the reference bus bar 30 from the bus bars 30 disposed at the center when viewed from all the bus bars 30. For example, when the number of the bus bars 30 provided in the bus bar module 20 is an odd number, the bus bar 30 disposed at the center may be set as the reference bus bar 30. Alternatively, when the number of the bus bars 30 provided in the bus bar module 20 is an even number, one of the two bus bars 30 at the center may be set as the reference bus bar 30.

The bus bar module 20 electrically connects the corresponding linear conductor 41 with respect to the bus bar 30 fitted to the first holding hole 43a or the second holding hole 43b. The bus bar 30 and the linear conductor 41 may also be electrically connected by a separately provided conductive member (not illustrated). Alternatively, the bus bar 30 and the linear conductor 41 may be directly joined. In this example, a tip end part $40a_1$ of the conductor part 40a in the flat cable 40 is bent toward the side of the bus bar 30 to be paired for each linear conductor 41. Then, the covering part 42a at the tip end of the tip end part $40a_1$ is peeled off, and the exposed linear conductor 41 is electrically connected to the connection part 31b of the bus bar 30 to be paired, by welding, brazing, or the like. The connection part 31b is a swollen portion of the flat portion of the bus bar main body 31, and has the length that corresponds to the thickness of the covering part 42a that covers the linear conductor 41, for example.

In the electrode terminal group 14 in this example, there is a possibility that the pitch between the electrode terminals 13 at both ends may be significantly shifted from the design value of the pitch between the through holes 31a at both ends in the bus bar module 20, due to accumulation of pitch shifts between the adjacent electrode terminals 13. However, in the bus bar module 20 of the present embodiment, all the bus bars 30 other than the reference bus bar 30 can move with respect to the flat cable 40 in the longitudinal direction of the flat cable 40. Consequently, with the bus bar module 20, by first inserting the reference bus bar 30 into the electrode terminal 13, and suitably and relatively moving the remaining bus bars 30 so as to match the positions of the electrode terminals 13, it is possible to insert all the bus bars 30 into the electrode terminals 13. Thus, the bus bar module 20 of the present embodiment can be assembled to the battery module 10.

In this manner, with the bus bar module 20, the bus bar 30 can be moved relative to the flat cable 40 in the longitudinal direction of the flat cable 40. Consequently, even when a pitch shift occurs between the electrode terminals 13 in the electrode terminal group 14, it is possible to assemble the bus bar module 20 to the battery module 10, without providing a bending part between the adjacent bus bars 30 in the conductor part 40a of the flat cable 40, as in the conventional technology described above. Thus, with the bus bar module 20 and the battery pack 1 of the present embodiment, there is no need to perform a bending process on the conductor part 40a or expand or contract the conductor part 40a. Hence, it is possible to eliminate the load on the linear conductor in the conventional conductor part that is applied during the bending process or when the conductor part is expanded or contracted. As a result, the bus bar module 20 and the battery pack 1 can suppress deterioration of durability of the flat cable 40, while ensuring the assembling property of the bus bar module 20.

Moreover, in the battery module 10, the pitch between the electrode terminals 13 may be increased due to thermal expansion caused by heat generation of the battery cells 11 while a vehicle is traveling, or the pitch between the electrode terminals 13 may be restored due to contraction caused when the battery cells 11 are cooled while the vehicle is stopped. However, with the bus bar module 20 of the present embodiment, the bus bar 30 (in this example, all the bus bars 30 other than the reference bus bar 30) can be moved relative to the flat cable 40 in the longitudinal direction of the flat cable 40, when the battery cell 11 is thermally expanded or contracted. Consequently, even when the pitch between the electrode terminals 13 is changed after the assembly, it is possible to reduce the load on the linear conductor 41 of the conductor part 40a and the holding part 40b in the flat cable 40. Thus, the bus bar module 20 and the battery pack 1 can suppress deterioration of durability of the flat cable 40, even after the bus bar module 20 is assembled to the battery module 10.

Furthermore, with the bus bar module 20 and the battery pack 1, cost required for performing the bending process on the conductor part 40a, and cost required for performing a cutting process on a portion that continues to the bending part in the rib 42b are not required. Consequently, it is possible to reduce the cost of the flat cable 40, while ensuring the assembling property of the bus bar module 20. Still furthermore, in the bus bar module 20 and the battery pack 1, because the bending part is not present in the conductor part 40a, it is possible to lower its back.

Figure 9:
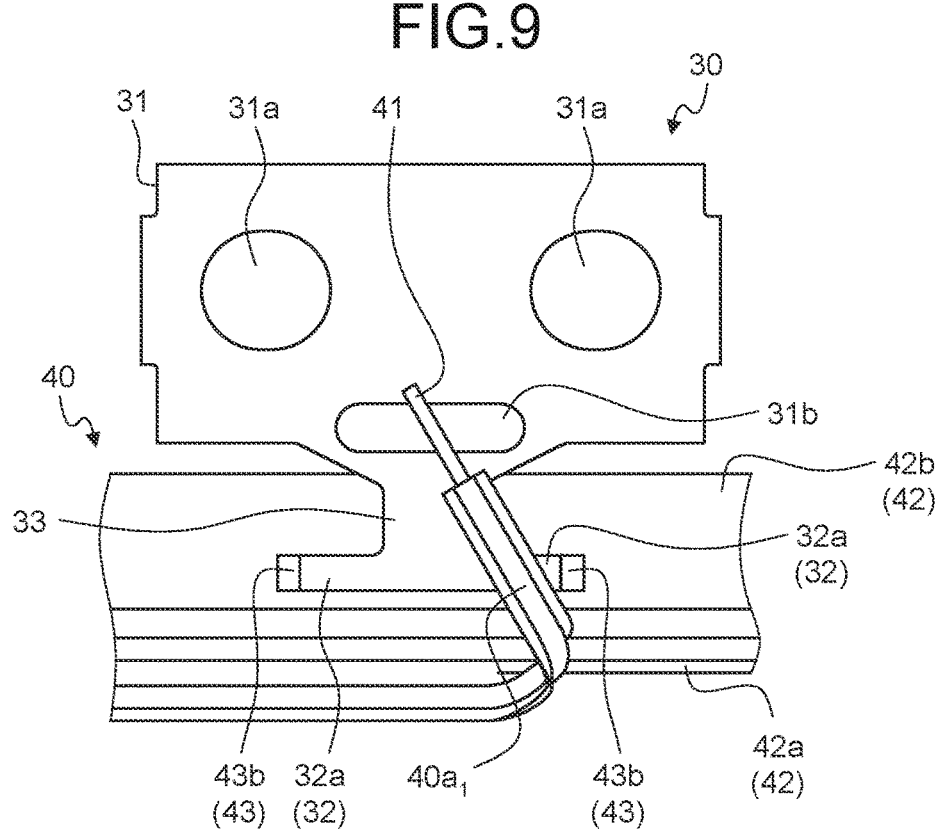
FIG. 9 is a front view illustrating an example of a variation of an electrical connection structure with respect to a bus bar of a flat cable.
Figure 10:
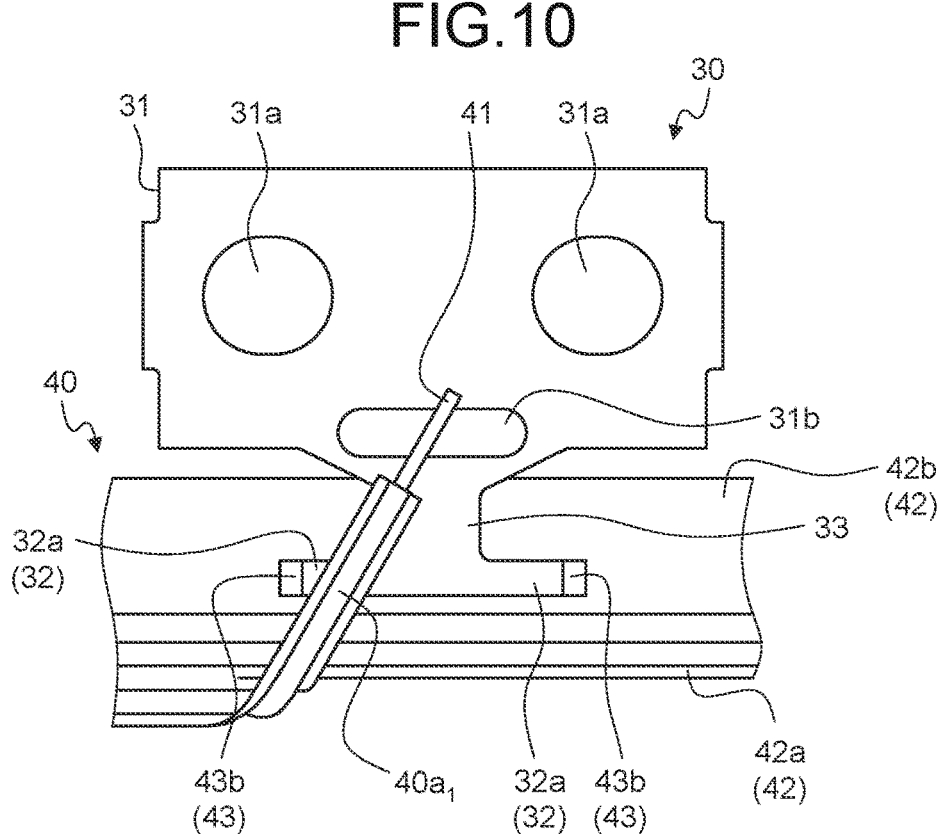
FIG. 10 is a front view illustrating another example of the variation of the electrical connection structure with respect to the bus bar of the flat cable.

In the flat cable 40, the tip end part $40a_1$ of the conductor part 40a is bent in the orthogonal direction with respect to the longitudinal direction of the flat cable 40. However, the tip end part $40a_1$ may also be tilted and bent with respect to the longitudinal direction of the flat cable 40 (FIG. 9 and FIG. 10). In particular, it is preferable to apply the tilted and bent tip end part $40a_1$ to the bus bar 30 fitted to the second holding hole 43b. When the tip end part $40a_1$ is applied to the bus bar 30, the bus bar 30 can be moved easily than that the tip end part $40a_1$ of which is bent in the orthogonal direction, when the bus bar 30 is moved relative to the flat cable 40 in the longitudinal direction of the flat cable 40. Consequently, in the flat cable 40, the load on the conductor part 40a is reduced when the bus bar 30 is relatively moved. From this point also, it is possible to suppress deterioration of durability.

Modification

Figure 11:
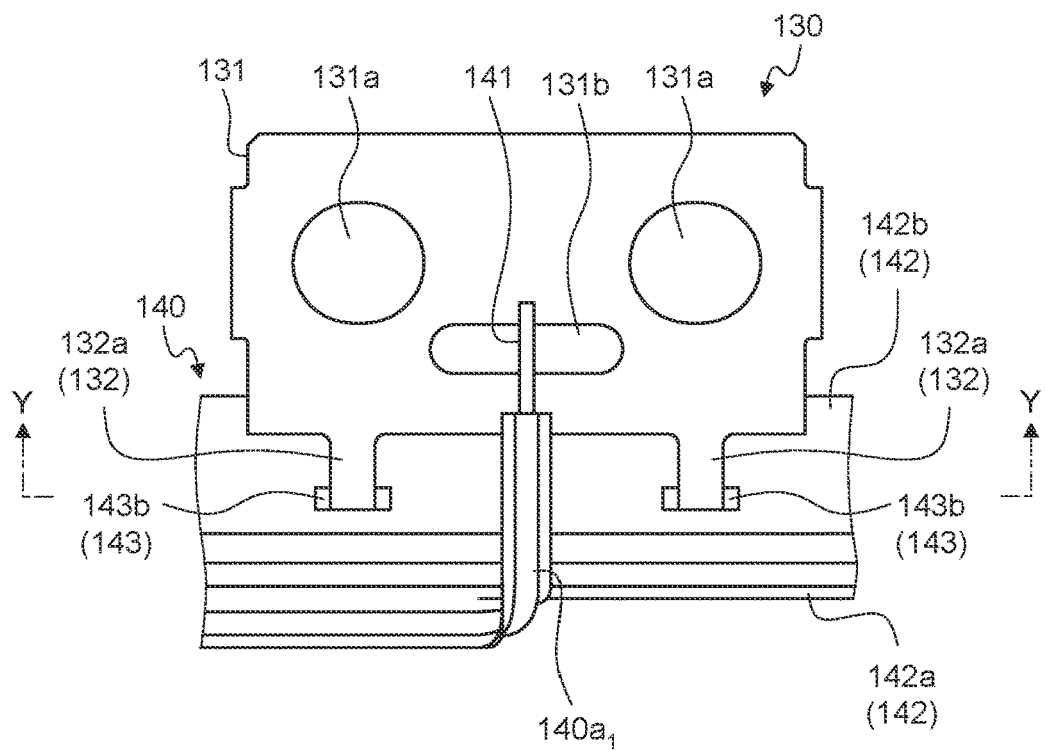
FIG. 11 is a front view of a second holding hole portion of a bus bar module of a modification.
Figure 12:
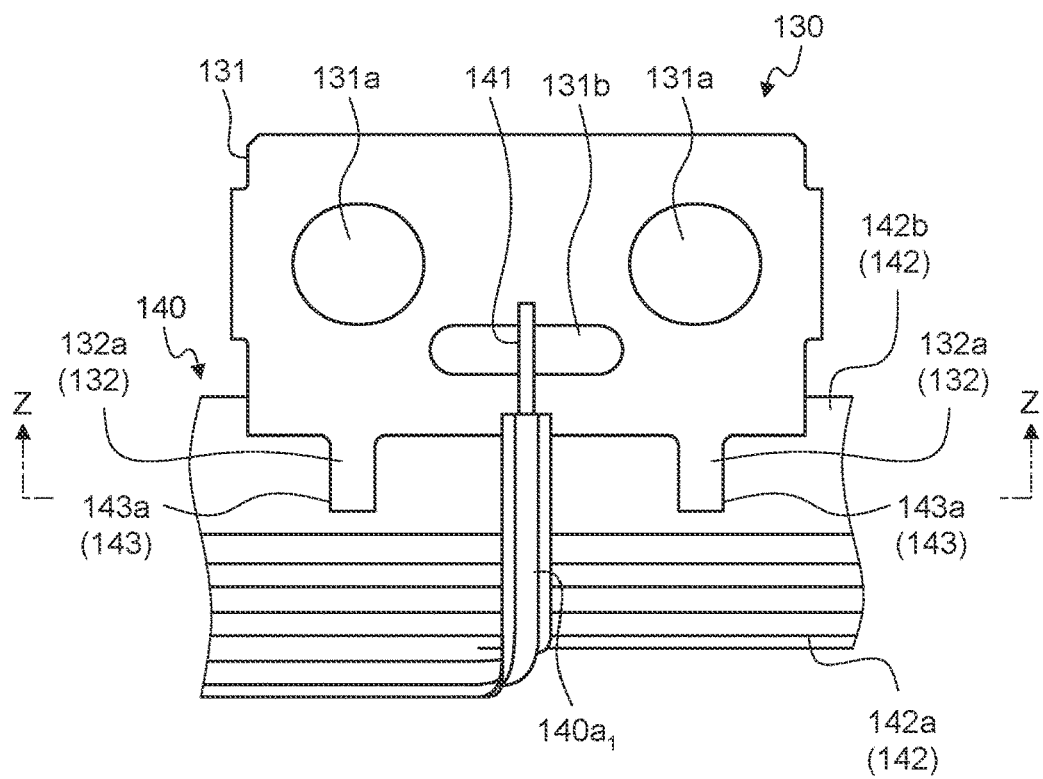
FIG. 12 is a front view of a first holding hole portion of the bus bar module of the modification.
Figure 13:
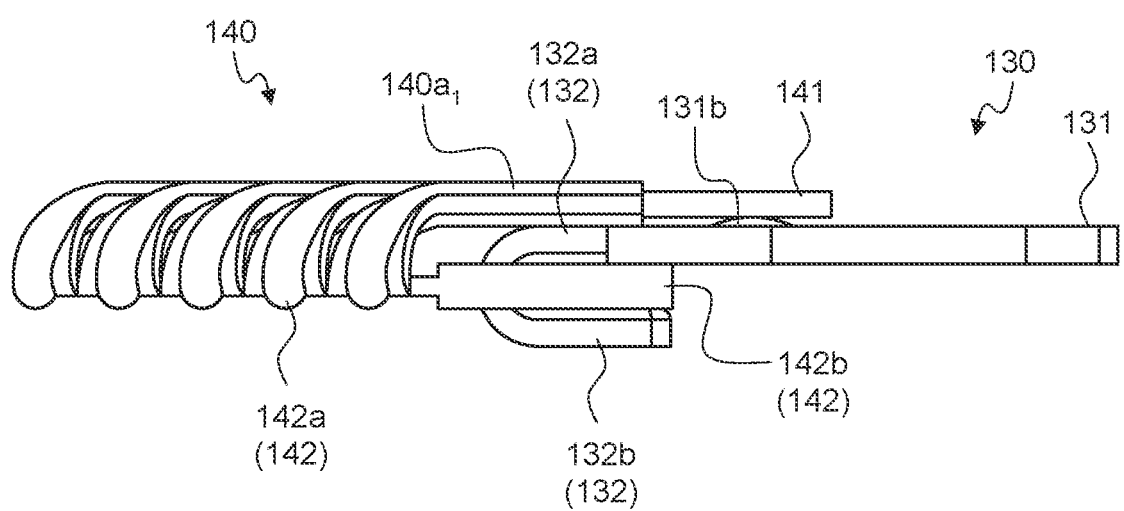
FIG. 13 is a side view illustrating the bus bar module of the modification.

The battery pack 1 of the present modification differs from that of the embodiment described above in that the bus bar 30 and the flat cable 40 are replaced by a bus bar 130 and a flat cable 140 to be described below (FIG. 11 to FIG. 13).

The bus bar 130 includes a rectangular bus bar main body 131 similar to the bus bar main body 31 of the bus bar 30 in the embodiment. Similar to the bus bar main body 31 of the embodiment, the bus bar main body 131 includes two through holes 131a into which the electrode terminals 13 are inserted, and a connection part 131b with which a linear conductor 141 at a tip end part $140a_1$ of the flat cable 140 is electrically connected.

Figure 14:
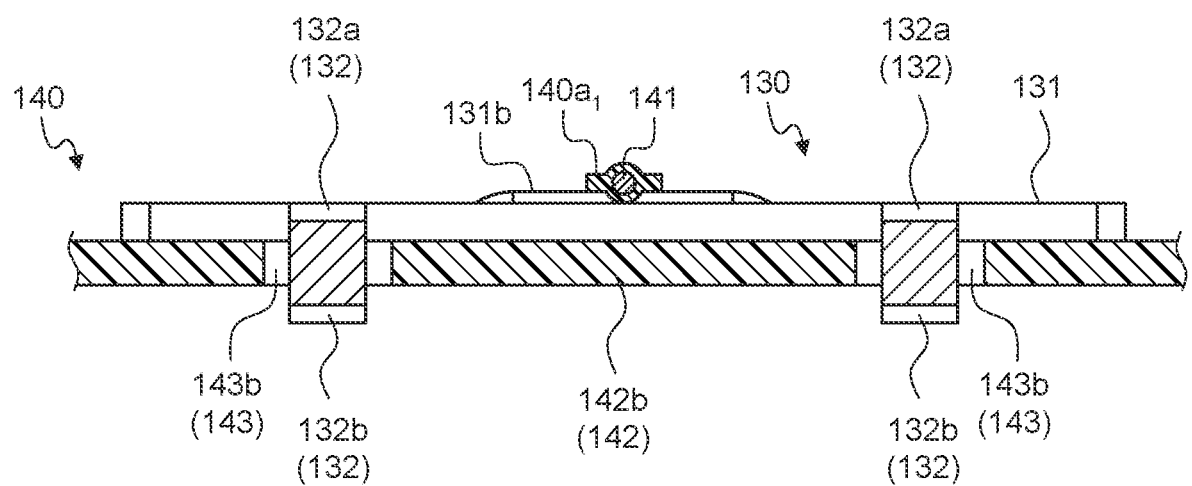
FIG. 14 is a sectional view of the bus bar module cut along a line Y-Y in FIG. 11.
Figure 15:
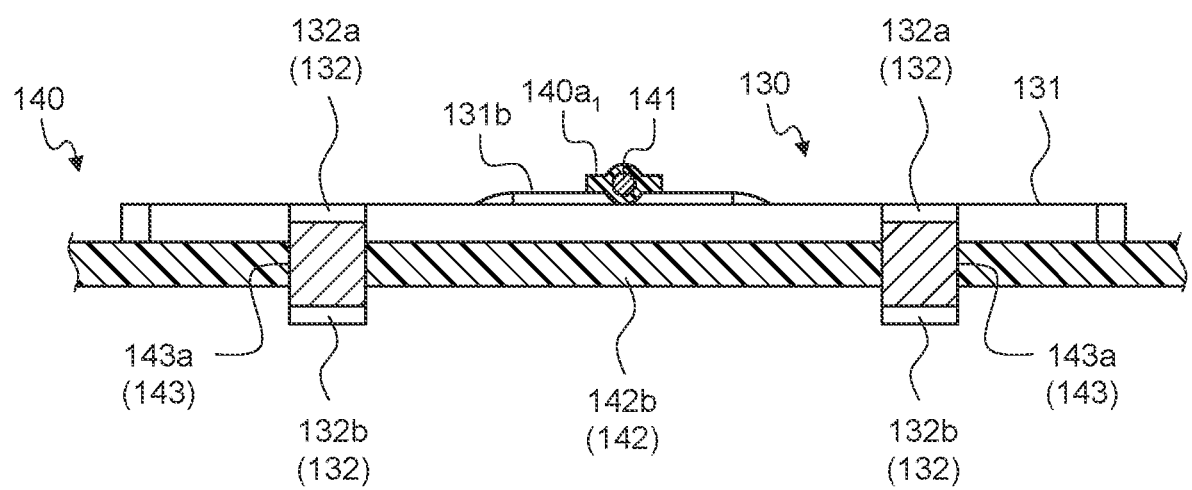
FIG. 15 is a sectional view of the bus bar module cut along a line Z-Z in FIG. 12.

Moreover, the bus bar 130 includes a holding body 132 protruded from an end of the bus bar main body 131. Similar to the bus bar 30 in the embodiment, two of the holding bodies 132 are provided on one of both end parts placed in the orthogonal direction with respect to the arranging direction of the two through holes 131a (arranging direction of the electrode terminals 13 in the electrode terminal group 14). The holding body 132 is formed of a first caulking part 132a that extends from one of the end parts in the orthogonal direction, and a second caulking part 132b that extends from the end part at the extending side of the first caulking part 132a in the orthogonal direction with respect to the first caulking part 132a (FIG. 13 to FIG. 15).

Similar to the flat cable 40 of the embodiment, the flat cable 140 includes the linear conductor 141 as many as that of the bus bars 130, and a covering body 142 that integrates the linear conductors 141 at intervals. The linear conductors 141 configure the conductor part 40a similar to that of the embodiment, with a part of the covering body 142 (covering part 142a). The remaining portion of the covering body 142 (rib 142b) configures the holding part 40b similar to that of the embodiment.

The covering body 142 includes a covering part 142a similar to the covering body 42 of the embodiment and a rib 142b. Similar to the rib 42b of the embodiment, in the rib 142b, two through holes (holding holes) 143 are formed for each bus bar 130. Similar to the embodiment, the holding holes 143 formed on the rib 142b are assumed to be a first holding hole 143a and a second holding hole 143b. The first holding hole 143a restricts the relative movement of the bus bar 130 with respect to the flat cable 140 in at least the longitudinal direction of the flat cable 140, by restricting the relative movement of the inserted holding body 132 in the longitudinal direction of the flat cable 140. The second holding hole 143b allows the relative movement of the bus bar 130, by allowing the relative movement of the inserted holding body 132 in the longitudinal direction. For example, in the rib 142b, only the second holding holes 143b may be provided for all the bus bars 130. Alternatively, in the rib 142b, the first holding hole 143a for the reference bus bar 130, and the second holding holes 143b for the remaining bus bars 130 other than the reference bus bar 130 may be provided. The latter is assumed in the present modification.

The length of the first holding hole 143a along the longitudinal direction of the flat cable 140 is formed equivalent to the width of the second caulking part 132b along the longitudinal direction. Consequently, by inserting the two second caulking parts 132b into the first holding holes 143a at two locations, and by bending the two second caulking parts 132b, the movement of the reference bus bar 130 is restricted so that the relative movement of the reference bus bar 130 with respect to the flat cable 140 in the longitudinal direction of the flat cable 140 will not be possible. In this example, the length of the first holding hole 143a along the orthogonal direction with respect to the longitudinal direction (short direction of the flat cable 140) may be formed equivalent to the sheet thickness of the second caulking part 132b along the short direction, or may be formed longer than the sheet thickness. The former is illustrated in the present modification.

The wall surfaces of the second holding hole 143b in the longitudinal direction of the flat cable 140 are formed such that the wall surfaces are disposed with respect to the second caulking part 132b that is disposed on the rib 142b as designed at intervals. In the bus bar 130, the two second caulking parts 132b are inserted into the second holding holes 143b at the two locations to be bent. A gap is then formed between the bent part and the wall surfaces of the second holding holes 143b in the longitudinal direction of the flat cable 140. Consequently, the bus bar 130 can move with respect to the flat cable 140 in the longitudinal direction of the flat cable 140. In this example, the length of the second holding hole 143b along the orthogonal direction with respect to the longitudinal direction (short direction of the flat cable 140) may be formed equivalent to the sheet thickness of the second caulking part 132b along the short direction, or may be formed longer than the sheet thickness. The former is illustrated in the present modification.

By configuring in this manner, in the bus bar module 20 of the present modification, the bus bar 130 can be moved relative to the flat cable 140 in the longitudinal direction of the flat cable 140. Consequently, even when a pitch shift occurs between the electrode terminals 13 in the electrode terminal group 14, it is possible to insert all the bus bars 130 into the electrode terminals 13, without providing a bending part between the adjacent bus bars 130 in the conductor part 40a of the flat cable 140, as in the conventional technology described above. Moreover, as the bus bar module 20 of the embodiment, the bus bar module 20 of the present modification can reduce the load applied to the flat cable 140, by the relative movement of the bus bar 130 with respect to the flat cable 140 according to the change in the pitch between the electrode terminals 13, when the battery cell 11 is thermally expanded or contracted after the insertion. Consequently, the bus bar module 20 and the battery pack 1 of the present modification can obtain the same effect as that of the embodiment.

With the bus bar module according to the present embodiment, the bus bar can be moved relative to the flat cable in the arranging direction of the electrode terminals. Consequently, even when a pitch shift occurs between the electrode terminals in the electrode terminal group, it is possible to insert all the bus bars into the electrode terminals, without providing a bending part between the adjacent bus bars in the conductor part of the flat cable. Moreover, with the bus bar module according to the present embodiment, even when the pitch between the electrode terminals is changed after the insertion, it is possible to reduce the load applied to the flat cable, by the relative movement of the bus bar with respect to the flat cable. Consequently, with the bus bar module and the battery pack according to the present embodiment, there is no need to perform a bending process on the conductor part or expand or contract the conductor part. Hence, it is possible to suppress deterioration of durability of the flat cable even after the assembly, while ensuring the assembling property of the bus bar module.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A bus bar module comprising:
    a plurality of bus bars each having a through hole into which an electrode terminal of an electrode terminal group is configured to be inserted, the electrode terminal group including a plurality of electrode terminals which are arranged linearly in an arranging direction on a battery module which is formed of a plurality of battery cells, the plurality of bus bars being configured to be arranged along the arranging direction of the plurality of electrode terminals in the electrode terminal group; and
    a flat cable including a plurality of conductor parts which are respectively and electrically connected to the plurality of bus bars, and an insulating holding part configured to hold the plurality of bus bars, wherein
    each of the plurality of bus bars includes a holding body configured to be fitted to the flat cable,
    the holding part includes holding holes corresponding to the plurality of bus bars, the holding holes including at least one first holding hole and at least one second holding hole, the at least one first holding hole having a portion of a reference holding body of a reference bus bar of the plurality of bus bars inserted therein, and being configured to restrict a relative movement of the reference bus bar with respect to the flat cable at least in the arranging direction by restricting a relative movement of the reference holding body in the arranging direction, the at least one second holding hole having a portion of another holding body of another bus bar of the plurality of bus bars inserted therein, and being configured to allow a relative movement of the another bus bar with respect to the flat cable in the arranging direction by allowing a relative movement of the another holding body in the arranging direction wherein the second holding holes have a length that is longer than a length of the first holding holes in the arranging direction.

2. The bus bar module according to claim 1, wherein the reference bus bar is disposed more towards a center of the plurality of bus bars in the arranging direction than distal ends of the plurality of bus bars.

3. The bus bar module according to claim 1, wherein respective tip end parts of the respective conductor parts are tilted and bent with respect to the arranging direction, and the conductor parts electrically connect to the respective plurality of bus bars via the tip end parts thereof.

4. The bus bar module according to claim 2, wherein respective tip end parts of the respective conductor parts are tilted and bent with respect to the arranging direction, and the conductor parts electrically connect to the respective plurality of bus bars via the tip end parts thereof.

5. A battery pack comprising:
a battery module formed of a plurality of battery cells; and
a bus bar module that electrically connects the battery cells in series or in parallel, wherein
the bus bar module includes:
    a plurality of bus bars each having a through hole into which an electrode terminal of an electrode terminal group is inserted, the electrode terminal group including a plurality of electrode terminals which are arranged linearly in an arranging direction on the battery module, the plurality of bus bars being arranged along the arranging direction of the plurality of electrode terminals in the electrode terminal group, and
    a flat cable including a plurality of conductor parts which are respectively and electrically connected to the plurality of bus bars, and an insulating holding part configured to hold the plurality of bus bars, wherein
each of the plurality of bus bars includes a holding body configured to be fitted to the flat cable,
the holding part includes holding holes corresponding to the plurality of bus bars, the holding holes including at least one first holding hole and at least one second holding hole, the at least one first holding hole having a portion of a reference holding body of a reference bus bar of the plurality of bus bars inserted therein, and being configured to restrict a relative movement of the reference bus bar with respect to the flat cable at least in the arranging direction by restricting a relative movement of the reference holding body in the arranging direction, the at least one second holding hole having a portion of another holding body of another bus bar of the plurality of bus bars inserted therein, and being configured to allow a relative movement of the another bus bar with respect to the flat cable in the arranging direction, by allowing a relative movement of the another holding body in the arranging direction, wherein the second holding holes have a length that is longer than a length of the first holding holes in the arranging direction.

* * * * *